(12) United States Patent
Hsu

(10) Patent No.: US 7,633,254 B2
(45) Date of Patent: Dec. 15, 2009

(54) SINGLE PHASE MOTOR DRIVING DEVICE

(75) Inventor: Chi-Lin Hsu, Taipei County (TW)

(73) Assignee: Princeton Technology Corporation, Taipei County (TW)

( * ) Notice: Subject to any disclaimer, the term of this patent is extended or adjusted under 35 U.S.C. 154(b) by 246 days.

(21) Appl. No.: 11/812,747

(22) Filed: Jun. 21, 2007

(65) Prior Publication Data
US 2008/0238350 A1 Oct. 2, 2008

(30) Foreign Application Priority Data
Mar. 30, 2007 (TW) ................................ 96205207 U

(51) Int. Cl.
*G05D 23/00* (2006.01)
(52) U.S. Cl. ............. 318/471; 318/400.09; 318/400.21; 318/772
(58) Field of Classification Search ................. 318/254, 318/139, 400.09, 400.11, 379, 471, 439, 318/772, 400.21, 441
See application file for complete search history.

(56) References Cited

U.S. PATENT DOCUMENTS

| | | | | |
|---|---|---|---|---|
| 4,481,454 A * | 11/1984 | Otani | ........................... | 318/696 |
| 5,105,352 A * | 4/1992 | Iwasa et al. | ..................... | 363/98 |
| 5,349,276 A * | 9/1994 | Mezzatesta et al. | .......... | 318/268 |
| 5,369,344 A * | 11/1994 | Mezzatesta et al. | .......... | 318/463 |
| 6,054,818 A * | 4/2000 | Tabata et al. | ................. | 318/139 |
| 6,922,032 B2 * | 7/2005 | Maeda | ......................... | 318/373 |
| 6,943,517 B2 * | 9/2005 | Yoshitomi et al. | ............ | 318/471 |
| 7,148,643 B2 * | 12/2006 | Yoshitomi et al. | ............ | 318/471 |
| 7,230,397 B2 * | 6/2007 | Nonaka | .................. | 318/400.11 |
| 7,408,318 B2 * | 8/2008 | Nakamura | ................... | 318/662 |
| 2004/0183490 A1 * | 9/2004 | Maeda | ......................... | 318/375 |
| 2005/0052147 A1 * | 3/2005 | Yoshitomi et al. | ............ | 318/471 |
| 2005/0269985 A1 * | 12/2005 | Yoshitomi et al. | ............ | 318/471 |
| 2006/0076910 A1 * | 4/2006 | Nonaka | ....................... | 318/254 |
| 2007/0092232 A1 * | 4/2007 | Fujii | ........................... | 388/814 |
| 2008/0239594 A1 * | 10/2008 | Shimazaki et al. | ............. | 361/23 |
| 2008/0315808 A1 * | 12/2008 | Mishima | ................. | 318/400.21 |
| 2009/0021199 A1 * | 1/2009 | Maeto et al. | ........... | 318/400.09 |
| 2009/0045762 A1 * | 2/2009 | Hayashi et al. | .............. | 318/379 |

* cited by examiner

*Primary Examiner*—Paul Ip
(74) *Attorney, Agent, or Firm*—Muncy, Geissler, Olds & Lowe, PLLC

(57) ABSTRACT

A device for driving a single phase motor is provided. The device controls the rotation of the single phase motor according to at least a control signal. The single phase motor driving device includes a control apparatus and a detection apparatus. The control apparatus detects the rotation or stopped rotation of the single phase motor, and outputs a detection signal and at least the control signal. The detection apparatus coupled to the control apparatus generates a first comparison signal and a second comparison signal according to the detection signal, compares the first comparison signal with the second comparison signal to generate a comparison result, and then further outputs a rotation signal or a stopped rotation signal according the comparison result; wherein the control apparatus generates the at least the control signal according the rotation signal and the stopped rotation signal.

8 Claims, 5 Drawing Sheets

SINGLE PHASE MOTOR DRIVING DEVICE

BACKGROUND OF THE INVENTION

1. Field of the Invention

The invention relates to a driving device, in more particularly to a single phase motor driving device.

2. Description of the Related Art

A variety of heat dissipation apparatuses have been developed as the higher power consumption of the electronic components results in increased heat generation. A radiator fan, or a plurality of fans, controlled by a motor is the most common method of dissipating heat.

The specific operation of a single phase motor is set forth in the following description. FIG. 1 is a schematic view of a conventional single phase motor. As shown in FIG. 1, in a conventional single phase motor driving device, NPN bipolar transistor 2 and 4 drive the current to a single phase coil 6 toward a direction 12 based on the provided driving signal A and D. Thus, the collector-emitter path of the bipolar transistor 2, the single phase coil 6, and collector-emitter path of the bipolar transistor 4, are serially connected between a power supply $V_{CC}$ and a ground $V_{SS}$. Similarly, NPN bipolar transistor 8 and 10 drives the current to the single phase coil 6 toward a direction 14 based on the provided driving signal C and B.

Consequently, the collector-emitter path of the bipolar transistor 8, the single phase coil 6, and the collector-emitter path of the bipolar transistor 10 are serially connected between the power supply $V_{CC}$ and the ground $V_{SS}$. Thus, the bipolar transistor 2 and 4, and the bipolar transistor 8 and 10 are complementarily turned on and off, thereby controlling the rotation of the motor by changing directions of the driving current passing the single phase coil 6.

The single phase motor continues to rotate while the driving current is supplied by the power supply. When the single phase motor is obstructed or otherwise incapacitated, a gridlock/deadlock state occurs and the current flowing through the single phase motor from the power supply may overheat and burn out the single phase motor. The entire electronic system, including all components thereof, may be damaged from due to overheating. It is thus desirable to detect whether a single phase motor is in deadlock state, and effectively stop supplying driving current to prevent burnout of the single phase motor.

BRIEF SUMMARY OF THE INVENTION

The invention provides a single phase motor driving device for controlling the rotation of a single phase motor according to at least a control signal, wherein the single phase motor driving device comprises a control apparatus and a detection apparatus. The control apparatus detects the rotation or stopped rotation of the single phase motor to generate a detection signal and at least the control signal. The detection apparatus coupled to the control apparatus generates a first comparison signal and a second comparison signal according to the detection signal, compares the first comparison signal with the second comparison signal to generate a comparison result, and further outputs a rotation signal or a stopped rotation signal in accordance with the comparison result, wherein said control apparatus generates at least the control signal based on the rotation signal and the stopped rotation signal.

A detailed description is given in the following with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
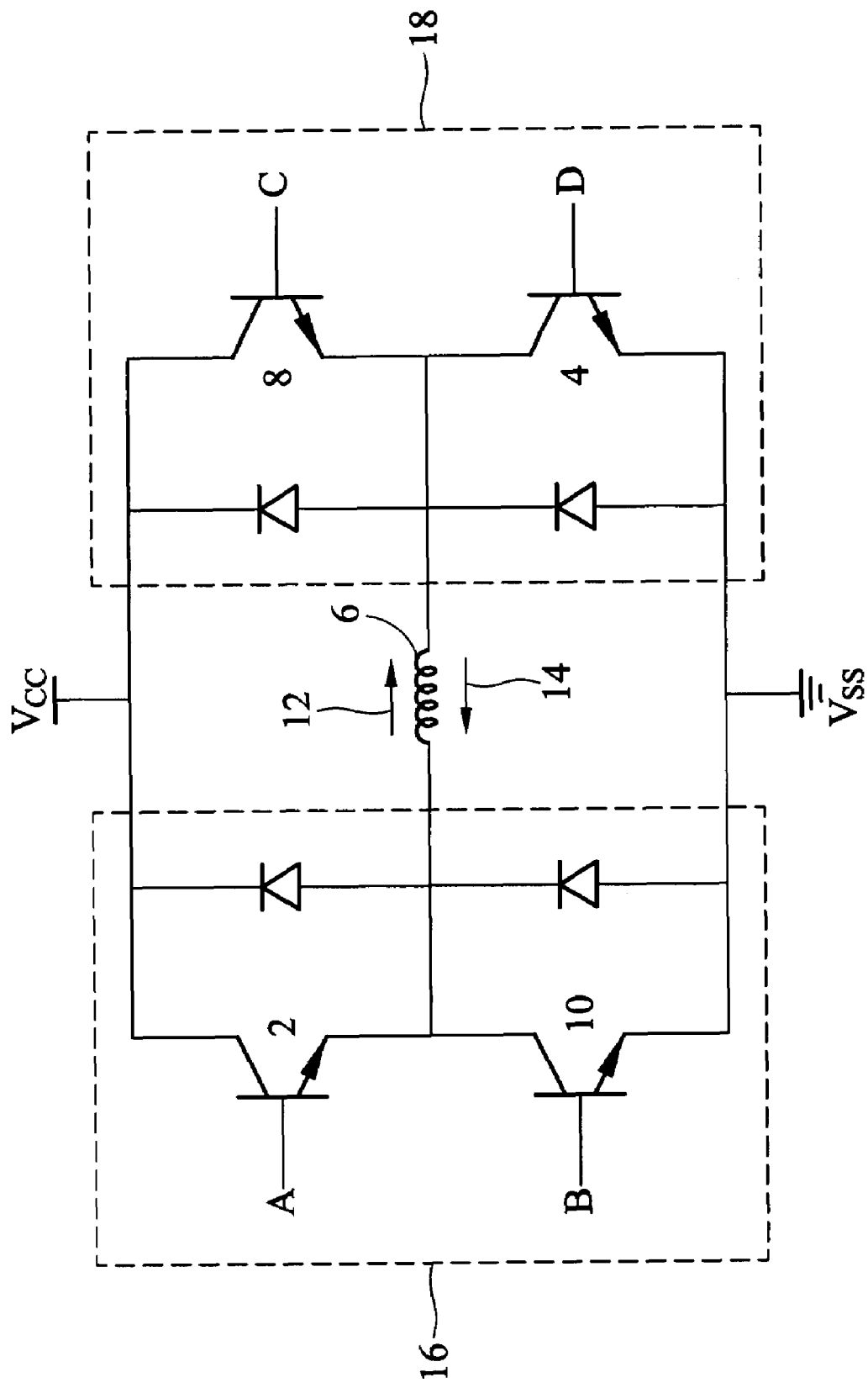
FIG. 1 is a schematic view of a conventional single phase motor.
Figure 2:
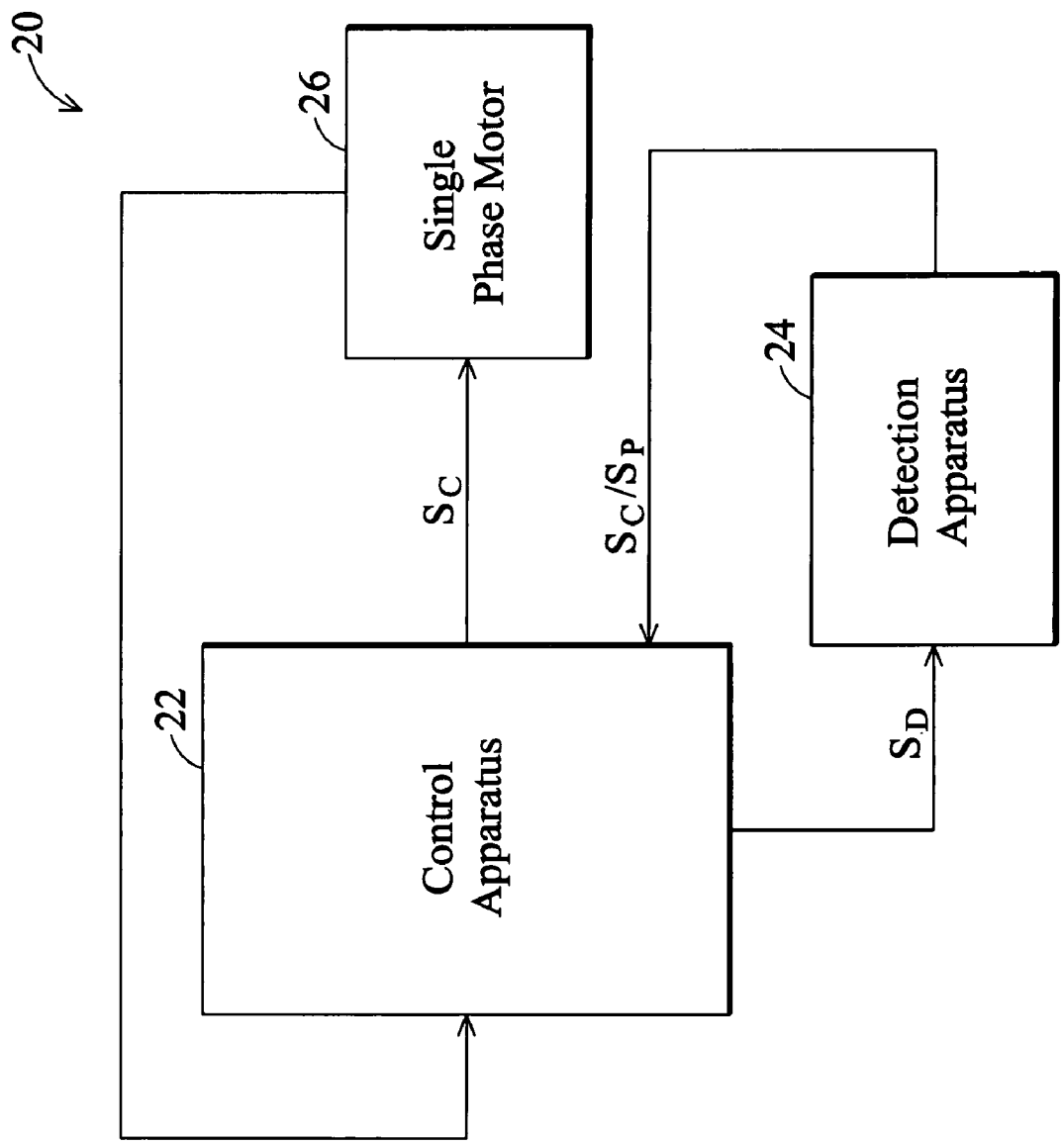
FIG. 2 is a block diagram illustrating a single phase motor driving device according to the invention.

Referring to FIG. 2, which is a block diagram illustrating a single phase motor driving device according to the invention. As shown in FIG. 2, a single phase motor driving device 20 controls the rotation of a single phase motor 26 according to at least a control signal Sc, wherein the single phase driving device 20 comprises a control apparatus 22 and a detection apparatus 24. The control apparatus 22 detects the rotation or stopped rotation of the single phase motor 26, generates a detection signal $S_D$ and at least the control signal Sc. In some embodiments, the control apparatus 22 further comprises a Hall component (not shown in FIG. 2), wherein the Hall component (not shown in FIG. 2) detects the rotation or stopped rotation of the single phase motor. The detection signal $S_D$ is a discharge pulse. The detection apparatus 24 coupled to the control apparatus 22 generates a first comparison signal $S_1$ and a second comparison signal $S_2$ according to the detection signal $S_D$, compares the first comparison signal $S_1$ with the second comparison signal $S_2$ to generate a comparison result, and subsequently outputs a rotation signal $S_R$ and a stopped rotation signal $S_P$ in accordance with the comparison result, wherein said control apparatus 22 generates at least the control signal $S_C$ according to the rotation signal $S_R$ or stopped rotation signal $S_P$. In an embodiment, the single phase motor driving device 20 disclosed is embedded in integrated circuits.

Figure 3:
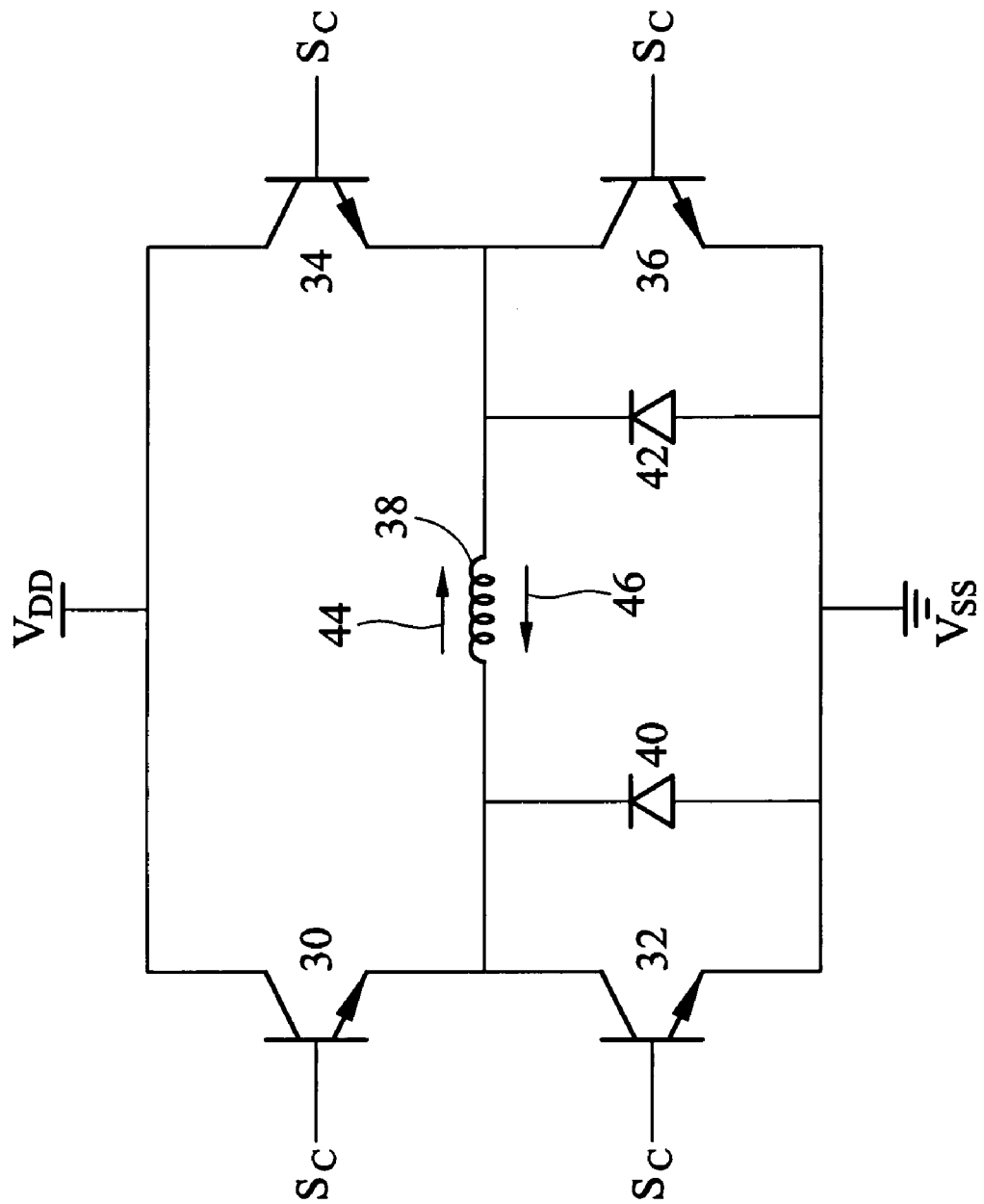
FIG. 3 is an exemplary view of a signal phase motor in a single phase motor driving device according to the invention.

Referring to FIG. 3, which is an exemplary view of a signal phase motor in a single phase motor driving device according to the invention. As shown in FIG. 3, the single phase motor 26 comprises a first transistor 30 and 36, and a second transistor 32 and 34, wherein the first transistor 30 and 36 provide a driving current with a first direction (Arrow 44) for a single phase coil 38, as well as the second transistor 32 and 34 provide a driving current with a second direction (Arrow 46) for the single phase coil 38. At least the control signal $S_C$, respectively controls the first transistor 30 and 36, and the second transistor 32 and 34, to generate the driving current with the first direction (Arrow 44) and the driving current with the second direction (Arrow 46).

In the present embodiment, the first transistor 30 and 36, and the second transistor 32 and 34 are the bipolar transistors. However, it is not limited to such transistors, the first transistor 30 and 36, and the second transistor 32 and 34 of the invention may be N-channel MOSFETs or P-channel MOSFETs.

In addition, as shown in FIG. 3, the single phase motor driving device 20 having a regenerating diode 40 and 42 for regenerating the driving current of the single phase coil 38 may substantially regenerate the driving current of the single phase coil 38. For the first transistor 30 and 36, and the second transistor 40 and 42, though the regenerating diode 40 and 42 in the present embodiment are the additional components, but not limited to this, the parasitic diodes of the first transistor 30 and 36, and the second transistor 32 and 34, may be utilized to reduce the size of the single phase motor driving device 20.

Figure 4:
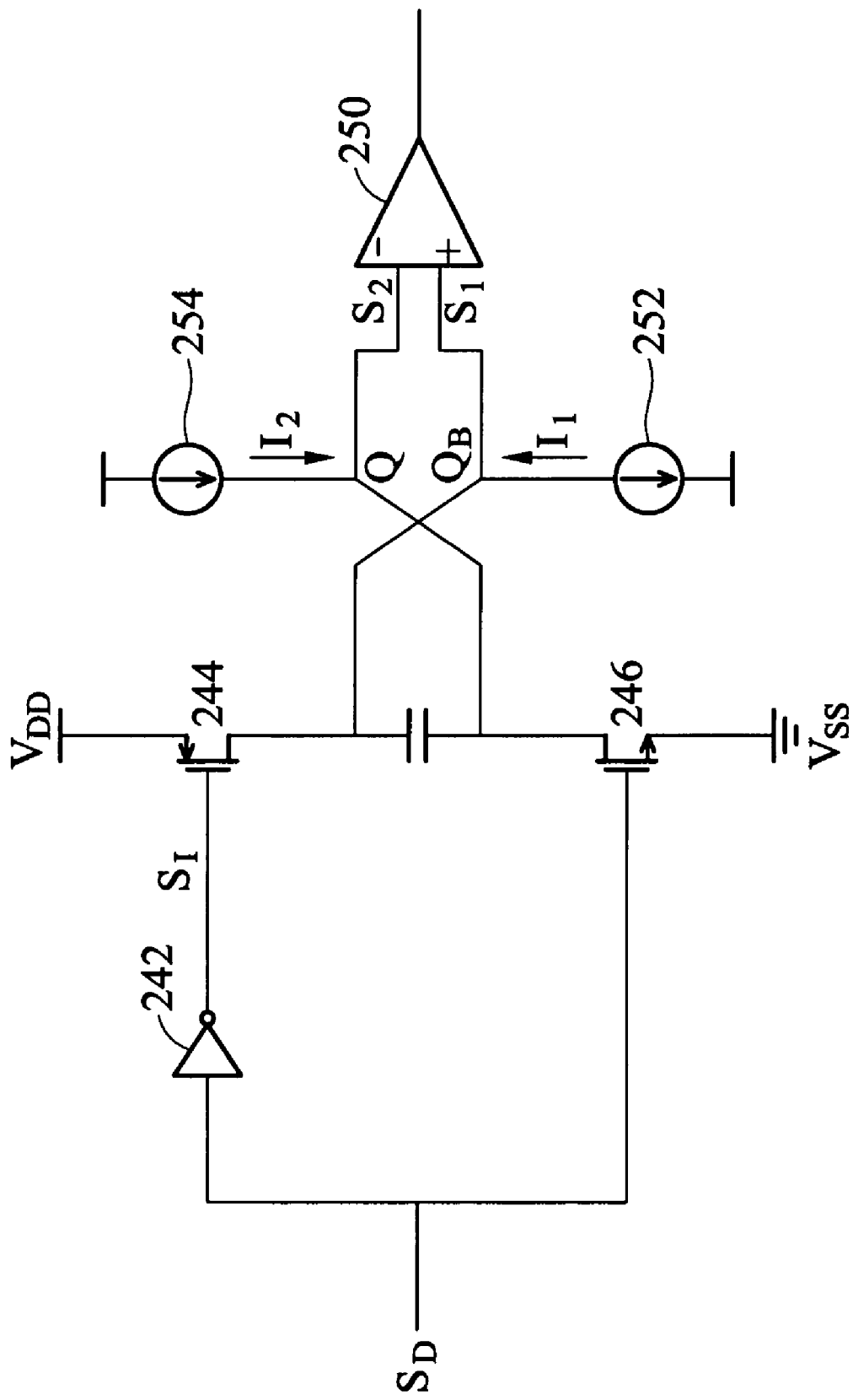
FIG. 4 is an exemplary view of a detection apparatus in a single phase motor driving device according to the invention.
Figure 5:
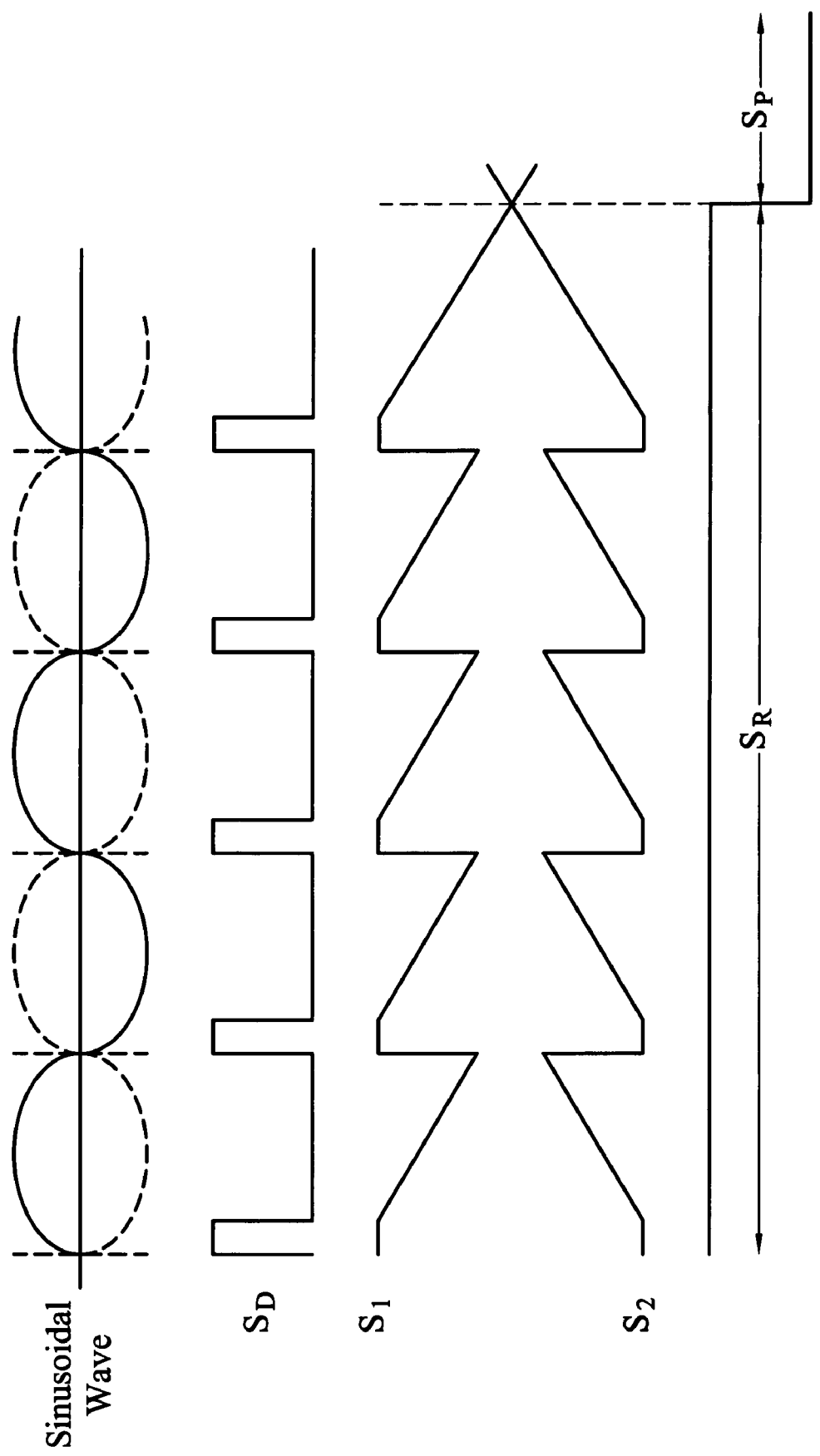
FIG. 5 is a waveform diagram showing the timing of a single phase motor driving device according to the invention.

Referring to FIG. 4, which is an exemplary view of a detection apparatus in a single phase motor driving device according to the invention. As shown in FIG. 4, the detection apparatus 24 comprises a voltage source $V_{DD}$, an inverter 242, a first transistor 244, a second transistor 242, a capacitor 248 and a comparator 250. The inverter 242 having an input terminal and an output terminal, wherein the input terminal coupled to the control apparatus 22 receives the detection signal $S_D$ to generate an opposite signal $S_1$. The first transistor 244 having three terminals, a first terminal (source), a second terminal (gate), and a third terminal (drain), wherein the first terminal (source) is coupled to the voltage source $V_{DD}$, and the second terminal (gate) is coupled to the output terminal of the inverter 242 for receiving the opposite signal $S_1$ on the second terminal.

The second transistor 246 having three terminals, a first terminal (gate), a second terminal (drain) and a third terminal (source), wherein the first terminal (gate) is coupled to the control apparatus 22 for receiving a detection signal $S_D$, and the third terminal (source) is coupled to a ground $V_{SS}$. The capacitor 248 has a first terminal $Q_B$ and a second terminal Q, wherein the first terminal $Q_B$ is coupled to the second terminal (drain) of the second transistor 246, and then the capacitor 248 generates a first comparison signal $S_1$ according to a first current I1 from the first terminal of the capacitor 248 and a second comparison signal $S_2$ according to a second current I2 from the second terminal of the capacitor 248. In an embodiment, the first comparison signal $S_1$ may be a charging voltage, and the second comparison signal $S_2$ may be a discharge voltage.

The comparator 250 includes a positive input terminal and a negative input terminal, wherein the positive input terminal is coupled to the first terminal $Q_B$ of the capacitor 248, as well as the negative input terminal is coupled to the second terminal Q of the capacitor 248, for comparing the first comparison signal $S_1$ with the second comparison signal $S_2$, generating a comparison result, and subsequently outputting a rotation signal $S_R$ and a stopped rotation signal $S_P$ in response to the comparison result. As shown in FIG. 4, a logic level high from the output terminal of the comparator 250 indicates output of the rotation signal $S_R$, and a logic level low from the output terminal of the comparator 250 indicates output of the stopped rotation signal $S_P$.

Additionally, the detection apparatus 24 further comprises a first current source 252 and a second current source 254. The first current source 252 coupled to the first terminal $Q_B$ of the capacitor 248 provides the first current I1. The second current source 254 coupled to the second terminal Q provides the second current I2.

Referring to FIG. 2 and FIG. 3, the operation of the control apparatus 22 and the detection apparatus 24 is provided in the following description. The detection apparatus 24 detects the rotation or stopped rotation of the single phase motor 26, and subsequently generates the rotation signal $S_R$ or stopped rotation signal $S_P$. When the single phase motor 26 is unable to rotate, the regeneration of the driving current for the single phase coil 38 by the control apparatus 22 may temporarily be suspended until the output of the detection apparatus 24 is switched from the stopped rotation single $S_P$ to the rotation signal $S_R$. Additionally, when the single phase motor 26 stops, the phase relationship between a magnet adjacent to a rotor (not shown) and the Hall component (not shown) is fixed during a period, and thereby the single phase motor 26 is incapable of rotating for the regenerating operation of driving current from the control apparatus 22. By the single phase motor driving device 20, the control apparatus 22 stops regenerating the driving current until the single phase motor 26 rotates. As a result, the single phase motor 26 is capable of returning to a start substantially even if the single phase motor 26 is stopped in the position and unable to start.

Referring to FIGS. 2~5, FIG. 5 is a waveform diagram showing the timing of a single phase motor driving device according to the invention. As shown in FIGS. 2~5, the control apparatus 22 generates the sinusoidal wave signals with 180 degree phase difference represented in a solid line and a dashed line according to the rotating position of the single phase motor 26. The sinusoidal wave signal converts the square wave signal through the squaring process. The control apparatus 22 then generates the detection signal $S_D$ according to the changing point of the square wave signal (i.e. current switching point of the driving current from the single phase coil 38 of the single phase motor 26). The detection signal $S_D$ is provided to the detection apparatus 24. When the single phase motor 26 rotates, the comparator 250 outputs a rotation signal $S_R$ when the charging voltage of the capacitor 248 is less than the discharge voltage. When the single phase motor 26 stops, the comparator 250 outputs a stopped rotation signal $S_P$ due to the charging voltage of the capacitor 248 being greater than the discharge voltage. The control apparatus 22 calculates and generates at least a control signal $S_C$ according to the rotation signal $S_R$ and the stopped rotation signal $S_P$ from the detection apparatus 24. Additionally, the single phase coil 38 controls the driving current, thus driving of the single phase motor 26 is accomplished.

The invention relates a single phase motor driving device, wherein the single phase motor driving device has a control apparatus and a detection apparatus. The detection apparatus detects rotating state of a single phase motor, and generates a rotation signal $S_R$ or a stopped rotation signal $S_P$. The control apparatus outputs at least a control signal $S_C$ according to the rotation signal $S_R$ or stopped rotation signal $S_P$ to stop providing the control signal Sc for the single phase motor, i.e. stop providing the driving current for the single phase motor. Accordingly, it is possible to prevent the single phase motor from overheating and burnout due to the constantly provided driving current when the single phase motor is in a gridlock/deadlock state due to a malfunction.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A single phase motor driving device for controlling the rotation of a single phase motor according to at least a control signal, comprising:

a control apparatus for detecting the rotation or stopped rotation of the single phase motor to generate a detection signal and at least the control signal; and a detection apparatus coupled to the control apparatus for generating a first comparison signal and a second comparison signal according to the detection signal, comparing the first comparison signal with the second comparison signal to generate a comparison result, and outputting a rotation signal or a stopped rotation signal according to the comparison result, wherein the detection apparatus comprises;

a voltage source;

an inverter having an input terminal and an output terminal, wherein the input terminal coupled to the control apparatus receives the detection signal and generates an opposite signal;

a first transistor having three terminals, the first transistor having a first terminal coupled to the voltage source, a second terminal coupled to the output terminal of the inverter to receive the opposite signal;

a second transistor having three terminals, the second transistor having a first terminal coupled to the control apparatus to receive the detection signal, and a third terminal coupled to a ground;

a capacitor having two terminals, the capacitor having a first terminal coupled to the third terminal of the first transistor, and a second terminal coupled to the second terminal of the second transistor, to generate the first comparison signal based on a first current on the first terminal and the second comparison signal based on a second current on the second terminal; and a comparator having a positive input terminal and a negative input terminal, wherein the positive input terminal coupled to the first terminal of the capacitor, and the negative input terminal coupled to the second terminal of the capacitor, to compare the first comparison signal with the second comparison signal for generating the comparison result, and further generating the rotation signal or stopped rotation signal based on the comparison result;

wherein the control apparatus generates at least the control signal according to the rotation signal and the stopped rotation signal.

2. The device as claim 1, further comprising:

at least a first transistor providing a driving current for a first direction of the single phase motor; and at least a second transistor providing a driving current for a second direction of the single phase motor;

wherein at least the control signal controls at least the first transistor and at least the second transistor respectively to generate the driving current for the first direction and the driving current for the second direction.

3. The device as claim 1, wherein the detection apparatus comprises:

a first current source coupled to the first terminal of the capacitor for providing the first current; and a second current source coupled to the second terminal of the capacitor for providing the second current.

4. The device as claim 1, wherein said device is embedded in integrated circuits.

5. The device as claim 1, wherein the detection signal is a discharge pulse.

6. The device as claim 1 wherein the first comparison signal is a charging voltage.

7. The device as claim 1, wherein the second comparison signal is a discharge voltage.

8. The device as claim 1, wherein the control apparatus further comprises a Hall component for detecting the rotation or stopped rotation of the single phase motor.

* * * * *